United States Patent [19]

Hisano et al.

[11] Patent Number: 4,994,285
[45] Date of Patent: Feb. 19, 1991

[54] EDIBLE BODY AND PROCESS FOR PREPARATION THEREOF

[75] Inventors: Jinpei Hisano; Akihiro Goto, both of Ibaraki; Kunihiko Okajima, Takatsuki, all of Japan

[73] Assignee: Asahi Kasei Kogyo Kabushiki Kaisha, Osaka, Japan

[21] Appl. No.: 243,306

[22] PCT Filed: Oct. 22, 1986

[86] PCT No.: PCT/JP86/00535
§ 371 Date: Aug. 8, 1988
§ 102(e) Date: Aug. 8, 1988

[87] PCT Pub. No.: WO88/02991
PCT Pub. Date: May 5, 1988

[51] Int. Cl.$^5$ .................. A23J 3/26; A23L 1/534
[52] U.S. Cl. ................... 426/104; 426/573; 426/574; 426/656; 426/657; 426/802; 426/803; 536/57
[58] Field of Search ............... 426/658, 573, 574, 104, 426/656, 657, 802, 803; 536/57

[56] References Cited

U.S. PATENT DOCUMENTS

| | | | |
|---|---|---|---|
| 3,362,831 | 1/1968 | Szczesniak | 426/803 |
| 3,623,885 | 11/1971 | Hamdy | 426/802 |
| 3,863,016 | 1/1975 | Yamakami | 426/802 |
| 3,925,562 | 12/1975 | Tannenbaum | 426/802 |
| 4,133,901 | 1/1979 | Fetzer | 426/802 |
| 4,154,856 | 5/1979 | Akin | 426/802 |
| 4,362,760 | 12/1982 | Fujita et al. | 426/802 |
| 4,507,327 | 3/1985 | Ueda | 426/803 |
| 4,744,988 | 5/1988 | Brox | 426/5 |

FOREIGN PATENT DOCUMENTS

| | | |
|---|---|---|
| 52-154533 | 12/1977 | Japan . |
| 5170837 | 6/1978 | Japan . |
| 60-42401 | 3/1985 | Japan . |
| 60-42438 | 3/1985 | Japan . |
| 61-130353 | 6/1986 | Japan . |

OTHER PUBLICATIONS

Mark, H. F. et al., "Encyclopedia of Polymer Science & Tech", vol. 3, 1965, John Wiley & Sons Inc., N.Y., pp. 155–157.

Primary Examiner—Jeanette Hunter
Attorney, Agent, or Firm—Finnegan, Henderson, Farabow, Garrett & Dunner

[57] ABSTRACT

An edible body composed of a cellulose having a crystal form of cellulose II, which is regenerated from an aqueous solution of an alkali metal hydroxide, and at least one guest component selected from polypeptides and edible polysaccharides. The cellulose II or a homogeneous mixture of the cellulose II and polysaccharide is present in the form of a sea component or a continuous phase in an amount of at least 10% based on the edible body. The edible body is made by adding at least one guest component selected from polypeptides, polysaccharides and living body constituents composed mainly thereof to an alkali solution in which up to 50 parts by weight of an undissolved cellulose is swollen and dispersed per 100 parts by weight of a dissolved cellulose, directly or after dissolution in an aqueous solution of an alkali, to form a dope in which at least 50% by weight of the total guest component is dissolved, extruding the dope through an extruder, coagulating the extrudate, and neutralizing, water-washing and, if necessary, drying the extrudate.

19 Claims, 6 Drawing Sheets

EDIBLE BODY AND PROCESS FOR PREPARATION THEREOF

TECHNICAL FIELD

The present invention relates to an edible body comprising a cellulose having a crystal form of cellulose II and at least one component selected from polypeptides and edible polysaccharides, and a process for the preparation thereof. This edible body has various functions and is used especially in the fields of food and agriculture.

BACKGROUND ART

Various researches and studies have been made into the formation of films and fibers from polypeptides, edible saccharides, and living body constituents containing these as main components. Most, however, have ended in industrial failure. The main reason for this is that the starting materials are expensive and the yields of final molded bodies are low, and products having a sufficient mechanical strength are difficult to obtain. As the rare instances of success, in connection with polypeptides, there can be mentioned the utilization of collagen as a casing film for packaging sausage and the formation of dried bean curds from soybeans. A separated soybean protein has been used as a fibrous protein and added to various fish meats and processed meat products. These products, however, have an insufficient mechanical strength, and satisfactory elasticity, strength and elongation characteristics are not manifested.

In connection with edible polysaccharides, various uses of pullulan films have been developed, and as is well known, starch is marketed as a medicine wrapping wafer, oblaat. However, it has been difficult to prepare products having a high mechanical strength from these alone. For example, an oblaat film is heterogeneous and has a poor strength, and even in the presence of a very small amount of moisture, the shape cannot be maintained and the oblaat film cannot properly function as an edible packing material.

To overcome some of these defects, trials have been carried out of adding a cellulose fiber or powder to the above-mentioned polypeptide or edible polysaccharide while the dietary property thereof is noted. For example, Japanese Unexamined Patent Publication No. 51-70873 teaches a process in which a granular cellulose and a protein are mixed by a special method. Furthermore, Japanese Unexamined Patent Publication No. 48-39670 discloses a process in which a chewing gum base is prepared by mixing gluten with granular cellulose. As is well known, a cellulose has an excellent dimensional stability as a regenerated fiber or cellophane, and is used as a starting material for the formation of a product having a satisfactory mechanical strength. But, by adding a fine powder or fine fiber of a cellulose only to the above-mentioned polypeptide or edible polysaccharide, the cellulose component is dispersed as an island component in the polypeptide or edible polysaccharide, and therefore, a prominent improvement of the mechanical strength cannot be expected. When a fine powder or fine fiber of a cellulose is used at too high a content, since the mixture maintains a solid structure inherently possessed by the cellulose, an incompatible taste is given, and in some cases, the cellulose has a bitter taste which remains in the mouth.

As means for improving the mechanical strength of an edible body of the above-mentioned polypeptide or edible polysaccharide by using a cellulose, there may be considered a process in which the cellulose is once dissolved, the desired substance is incorporated in the solution, and the cellulose is regenerated. Although attainment of this object is not intended, Japanese Unexamined Patent Publication No. 51-55355 discloses a process in which in order to obtain a cheap regenerated cellulose film, modified starch is added to a cuprammonium solution or viscose solution of a cellulose. However, incorporation of toxic substances such as by-products derived from a copper ion or carbon disulfide are present in the product described in this publication, and therefore, this process cannot be utilized in the field of food.

We carried out research with a view to overcoming the defects of the above-mentioned polypeptide or edible polysaccharide, that is, (1) brittleness and poor mechanical strength, and (2) a high cost of the starting material, by utilizing a cellulose, and also to overcoming the defects of the cellulose, that is, an incompatible taste remaining in the mouth, by changing the mixed or dispersed state in the polypeptide or edible polysaccharide.

DISCLOSURE OF THE INVENTION

Under this background, we carried out research, and as a result, it was found that if a cellulose soluble in a solution of an alkali such as caustic soda and a polypeptide, an edible polysaccharide or a living body constituent are mix-dissolved or mix-dispersed to form a dope, and this dope is coagulated, as disclosed in Japanese Unexamined Patent Publications No. 60-42401 and No. 60-42438, and Japanese Patent Application No. 60-27544, an edible body having a special dispersion state can be obtained.

This edible body has no toxicity but is different from the conventional composition comprising a cellulose dispersed in a polypeptide or polysaccharide in that, even if the cellulose content is high, no incompatible taste is given on eating and the cellulose does not remain in the mouth. This edible body has excellent mechanical strengths, good water-absorbing property, and superior wet processability.

In accordance with the present invention, there is provided an edible body consisting essentially of a structural body comprising a cellulose having a crystal form of cellulose II, which is regenerated from an aqueous solution of an alkali metal hydroxide, and at least one guest component selected from polypeptides and edible polysaccharides, wherein the cellulose II or a homogeneous mixture of the cellulose II and polysaccharide is present in the form of a sea component or a continuous phase in an amount of at least 10% based on the structural body.

By the term "sea component" is meant a phase distributed in the state surrounding another phase, when the section of the structural member is observed by a transmission type electron microscope or optical microscope, and by the term "continuous phase" is meant a phase continuously distributed, which may contain voids.

By the passage "in the form of a sea component or a continuous phase in an amount of at least 10% based on the structural body", we mean that, in the edible body which is composed of the sea and islands, when a cross-section of the edible body is observed by a microscope at a magnification such that at least five islands are found in the field of view, the proportion of the area of the sea to the total area of the field of view is at least 10%. In the edible body wherein the sea and islands are not found, when a cross-section thereof is observed in a similar manner, the proportion of the area of the continuous phase to the total area of the field of view is at least 10%.

The above-mentioned edible body is prepared according to a process comprising adding at least one component selected from polypeptides, polysaccharides, and living body constituents composed mainly thereof, to an alkali solution in which up to 50 parts by weight of an undissolved cellulose is swollen and dispersed per 100 parts by weight of a dissolved cellulose, directly or after dissolution in an aqueous solution of an alkali, to form a dope in which at least 50% by weight of the total quest component is dissolved, extruding the dope through an extruder, coagulating the extrudate, and neutralizing, water-washing and, if necessary, drying the extrudate.

BRIEF DESCRIPTION OF THE DRAWINGS

FIG. 1-A shows a solid CP/MAS$^{13}$C-NMR spectrum of the $C_1$-to-$C_4$ carbon peak region of natural cellulose;

FIG. 1-B shows a solid CP/MAS$^{13}$C-NMR spectrum of the $C_4$ carbon peak region of regenerated cellulose;

BEST MODE FOR CARRYING OUT THE INVENTION

By the term "edible body" used in the instant specification is meant a structural body in which a paper-like taste inherent to cellulose is controlled and which can be eaten by humans.

As the cellulose that is used as the starting material in the present invention, there can be mentioned a natural cellulose in which the intramolecular halogen bond degree Hb (3+6) at the C3 and C6 positions, which is defined by the CP/MAS$^{13}$C-NMR measurement, is not more than 60%, and a regenerated cellulose in which the intramolecular hydrogen bond degree Hb (3) at the C3 position is not more than 30%. Preferably, the solubility, defined hereinafter, of the cellulose is at least 67%. A natural cellulose in which the intramolecular hydrogen bond degree Hb (3+6) is 0 to 48% and a regenerated cellulose in which the intramolecular hydrogen bond degree Hb (3) at the C3 position is 0 to 15% and the solubility is almost 100% are especially preferable. If such a cellulose is used, mixing with a polypeptide and/or an edible polysaccharide, defined in the present invention, can be guaranteed and a higher mechanical strength can be realized in the obtained edible body. Since the presence of an undissolved cellulose is allowed in the edible body of the present invention, a cellulose other than those mentioned above may be used in combination with the above-mentioned cellulose. However, if the content of the undissolved cellulose is higher than 50% by weight based on the cellulose dissolved in the dope prepared in the process for preparing the edible body of the present invention, an edible body having sufficient mechanical strength cannot be obtained.

The method for determining 13C-NMR referred to in the instant specification and the method for determining the degrees Hb (3+6) and Hb (3) will now be described.

A solid high-resolution 13C-NMR spectrum is measured according to the CP/MAS (cross-polarization magic angle spinning) method using a pulse-Fourier conversion type NMR spectrometer. A sample is packed in a Teflon sample tube. The contact time is about 2 milliseconds, and the sample rotation number is at least 3000 Hz. The measurement is carried out when the sample is in the air-dried state or the wet state. The chemical shift of each peak is determined on the basis of the preposition that the value of the methyl peak of admantane determined under the same conditions as described above is 29.5 ppm. The measurement is carried out at a temperature ranging from room temperature to 60° C. Pulses are integrated more than 500 times.

Figure 1A:
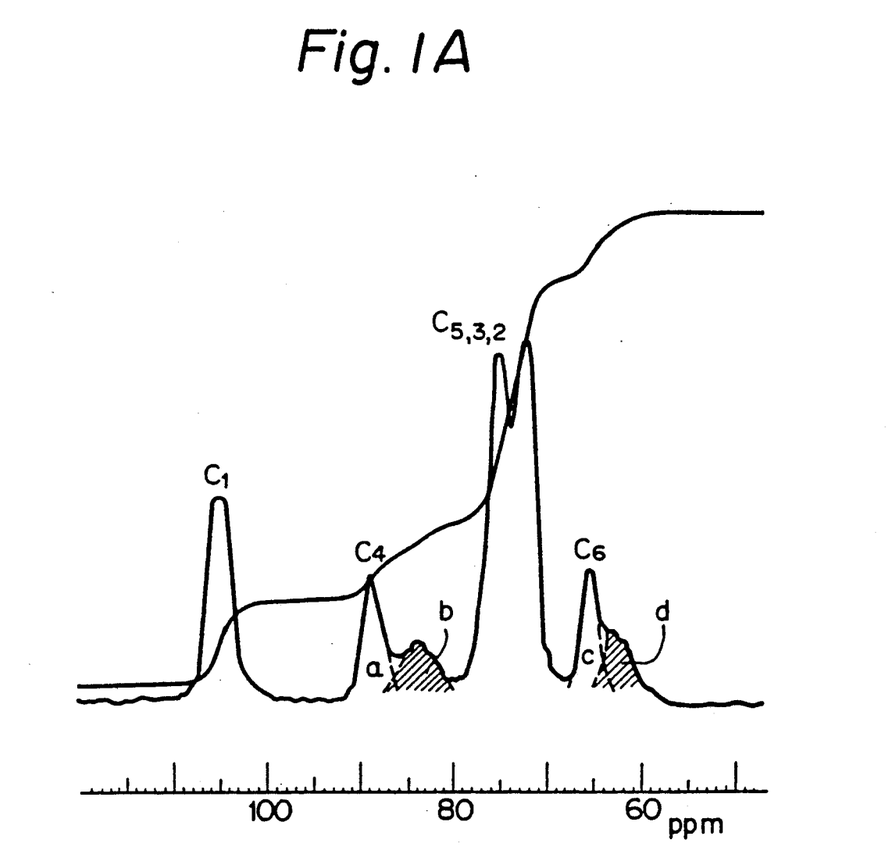
Figure 1B:
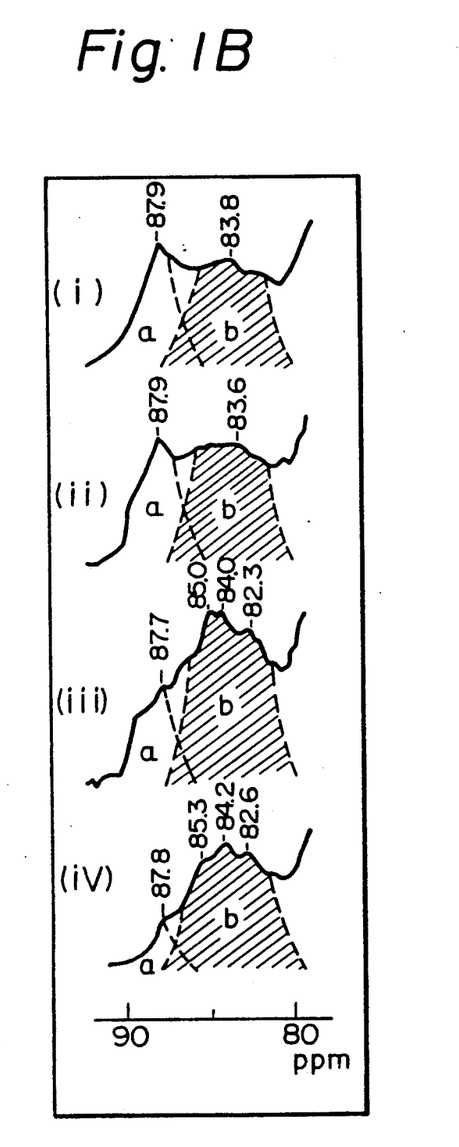

FIG. 1-A shows the solid CP/MAS $^{13}$C-NMR spectrum of the $C_1$-to-$C_6$ carbon peak region of natural cellulose, and FIG. 1-B shows the CP/MAS $^{13}$C-NMR spectrum of the C4 carbon peak of regenerated cellulose. The degrees Hb (3+6) and Hb (3) defined above are proportions of unhatched regions (low-magnetic field regions) of the C4 carbon peak and the C4 and C6 carbon peaks, and are ordinarily determined from an integrated curve of the spectrum. Referring to the drawings, the degree Hb (3+6) applied to natural cellulose is expressed by the area ratio [(a+b)-/(a+b+c+d)]×100 (%). In the cellulose shown in FIG. 1-A, the degree Hb (3+6) is 45%. The degree Hb (3) applied to regenerated cellulose is expressed by the area ratio [a/(a+b)×100 (%)] in FIG. 1-B. In FIG. 1-B, (i) through (iv) indicate celluloses differing in the degrees Hb (3), and having the degrees Hb (3) of 44%, 38%, 21%, and 13%, respectively. Furthermore, a and c are area ratios of the unhatched portions (low-magnetic field regions) of the C4 and C6 carbon peaks, and are ordinarily determined from the integrated curve of the spectrum. On the other hand, b and d are area ratios of the hatched regions (high-magnetic field regions) of the C4 and C6 carbon peaks.

The natural cellulose in which the intramolecular hydrogen bond degree at the C3 and C6 positions is not more than 60% is obtained by adjusting the polymerization degree of a natural cellulose such as wood pulp, cotton or flax by the acid hydrolysis, or by subjecting a natural cellulose to a mechanical pulverization treatment, a blasting treatment, an extruder treatment at a high temperature or a treatment with an enzyme solution. A regenerated cellulose in which the intramolecular hydrogen bond degree is not more than 30% is obtained by dissolving a cellulose in a solvent and performing neutralization regeneration or coagulation or evaporating an easily-volatile solvent component to effect coagulation and regeneration.

A preferred cellulose having a high alkali solubility, that is, a natural cellulose having an Hb (3+6) value of 0 to 48% or a regenerated cellulose having an Hb (3) value of 0 to 15%, is prepared by subjecting a natural cellulose having the polymerization degree, defined hereinafter, adjusted below 700, such as wood pulp, cotton or flax, to a blasting or extruder treatment from the high-temperature and high-pressure state in the presence of a hydrogen bond cleaving agent, treating such a natural cellulose with an enzyme solution or dissolving such a natural cellulose in a solvent, neutralizing and regenerating the cellulose or coagulating the cellulose in a non-solvent, or evaporating an easily-volatile solvent component to effect coagulation and regeneration. In view of the attainment of a very high alkali solubility, a regenerated cellulose obtained by dissolving a cellulose in a cuprammonium solution, evaporating the ammonia component, solidifying the residue and neutralizing and regenerating the solid with an acid solution is most preferable. However, if a salient amount of copper remains in the resulting edible body, the copper is poisonous. Therefore, the regenerated product is washed repeatedly so that the amount of copper is reduced below 10 ppm. As the hydrogen bond cleaving agent, there can be mentioned solvents for celluloses, such as water, an aqueous solution of an alkali, an aqueous solution of an acid, and an aqueous solution of a salt.

The solubility referred to in the instant specification is determined as follows. Namely, the cellulose is dissolved at a concentration of 5% by weight in an aqueous solution containing 9.1% by weight of sodium hydroxide at a temperature of 5° C., and the undissolved portion is centrifugally separated at a rotation number of 7000 rpm and the cellulose is neutralized and regenerated. Then, the cellulose is weighed. The solubility is determined from the obtained value and the initially charged amount of the cellulose.

The polymerization degree is not particularly critical, but in the case of a natural cellulose having an Hb (3+6) value of 0 to 48% or a regenerated cellulose having an Hb (3+)) value of 0 to 15%, in view of the preparation process, it is difficult to obtain a cellulose having a polymerization degree higher than 1200. In order to obtain a final edible body having a high mechanical strength, it is sufficient if the polymerization degree of the alkali-soluble cellulose is not lower than 100. If the polymerization degree is lower than 100, a reinforcing effect cannot be attained by utilization of the cellulose. The polymerization degree referred to in the instant specification is determined according to the following method.

The viscosity average polymerization degree determined from the viscosity of a cadoxene solution. More specifically, in 2414 g of distilled water is gradually incorporated 900 g of ethylenediamine of the guaranteed reagent while maintaining the liquid mixture at 0° C. Then, 318 g of cadmium oxide of the guaranteed reagent is gradually added over a period of 2 to 3 hours while stirring the liquid mixture at 0° C. The mixture is allowed to stand overnight at −15° C., and 60 ml of ethylenediamine, 155 ml of distilled water and 14 g of caustic soda are added to 950 ml of the supernatant to form a starting cadoxane solution. The weighed cellulose is dissolved in the starting cadoxene solution maintained below 6° C., and the solution is diluted with distilled water in the same amount as that of the starting cadoxene solution. The concentration (g/dl) of the solution is designated as c. The falling time t (seconds) of the cellulose/cadoxene solution and the falling time $t_0$ (seconds) of the cadoxene solution diluted at a ratio of 2 are measured at 25° C. by a Ubbellohde viscometer in which the falling time of the water is about 80 to about 120 seconds at 20° C. The viscosity average molecular weight Mv is calculated by substituting the inherent viscosity defined by the formula $$[\eta] = \lim_{c \to 0} [(t/t_0 - 1)/c]$$

into the viscosity formula $[\eta] = 3.85 \times 10^2$ Mv$^{0.76}$ of Brown-Wikstrim (Euro. Polym. J., 1, 1, 1966). The obtained value is divided by 162 to determine the viscosity average polymerization degree. By using the empirical rule of the concentration dependency of the viscosity, the inherent viscosity may be determined as a solution of the following equation from the value of the falling time at one concentration point:

$$ck[\eta]^2 = [\eta] - v = 0$$

wherein $v = (t/t_0 - 1)/c$ and $k = 0.03361 + 0.2061$.

As the polypeptide used as the guest component, there can be mentioned soybean proteins purified by various methods, casein, albumin, globulin and gelatin, and Na, Ca and K salts thereof. These polypeptides may be partially hydrolyzed. Each of them is soluble or substantially soluble in a dilute aqueous solution of an alkali. In view of mixing with the cellulose solution and improvement of the mechanical properties of the obtained edible body, a polypeptide which is completely soluble in a dilute aqueous solution of an alkali is preferred.

As the edible polysaccharide used in the present invention, there can be mentioned gum arabic, arabino galactan, alginic acid, gum ghatti, carrageenin, karaya gum, xanthane gum, guar gum, devil's-tongue powder, tamarind gum, tala gum, tragacanth gum, furcellaran, pullulane, pectin, chitin, locust bean gum, xylan, mannan and starches (corn starch, amylose-rich starch, potato starch and rice starch), and salts thereof, such as Na, K and Ca salts. All of these edible polysaccharides except chitin are completely soluble in water or a dilute aqueous solution of an alkali. Accordingly, a molded edible body of a mixture of such a polysaccharide with a cellulose has particularly excellent mechanical characteristics.

The polypeptide and polysaccharide used in the present invention may be in the form of a living body constituent. By the living body constituent is meant a living body constituent containing one or both of a polypeptide and polysaccharide derived from a plant, an animal or a microorganism, preferably a living body constituent containing the polypeptide and/or polysaccharide in an amount of at least 50% based on the total solid except water. As typical examples of the living body constituent derived from a plant, there can be mentioned oil cakes, grains, beans, plant stalks and leaves, algae, fruits and tuberous roots. More specifically, there can be mentioned defatted soybean, soybean meal, baked soybean flour, linseed oil cake, cotton seed oil cake, coconut oil cake, sufflower oil cake, sesame oil cake, sun flower oil cake, wheat, barley, rice and soybean (whole fat soybean). As examples of the constituent derived from an animal, there can be mentioned fish meal, fish soluble, meat flour, meat bone powder, decomposed hair, decomposed leather, feather meal, skim milk powder, fish meat, meat (beef, pork, mutton or the like), entrails, egg constituents (york and albumen), krill, and milk constituents. As examples of the living body constituent derived from a microorganism, there can be mentioned yeasts, bacteria, and molds. These living body constituents comprise proteins and/or polysaccharides as the main component and also contain impurities such as lipids, nucleic acids, lignins and inorganic salts. If such impurities are contained, mixing with the cellulose solution is not hindered, but the spinnability or stringiness is improved and appropriate fusion bonding is advantageously attained among spun fibers.

The guest component to be mixed with the cellulose, which is selected from polypeptides, edible polysaccharides and living body constituents, need not be composed of a single substance but may be a mixture of two or more of the foregoing substances.

In the edible body of the present invention, cellulose II or a homogeneous mixture of cellulose II and the edible polysaccharide (where the polysaccharide is used) is present as the sea component or continuous phase in an amount of at least 10%.

Figure 4:
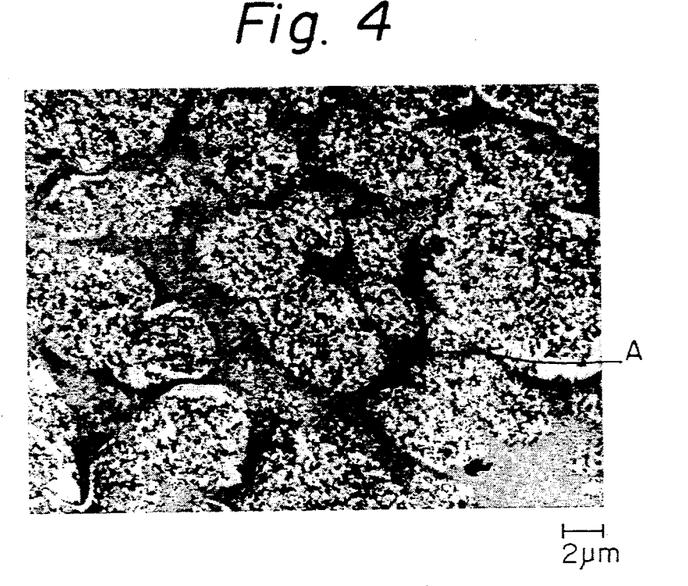
Figure 5:
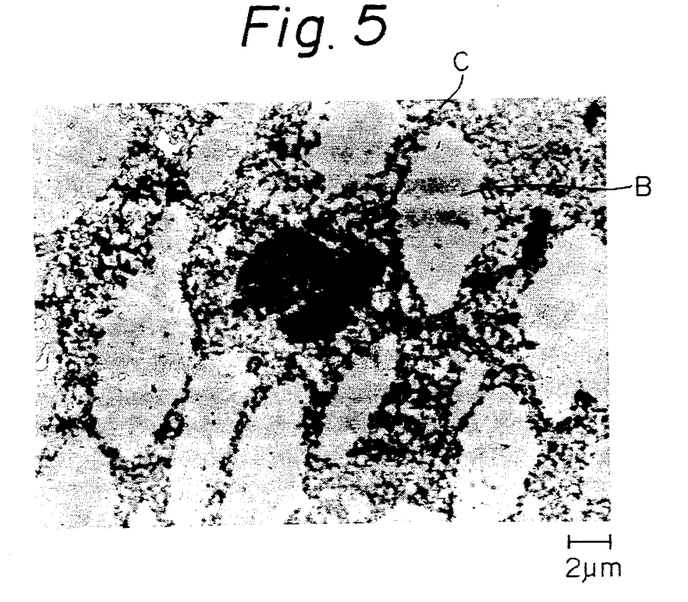

When the section of the edible structural body is observed by a transmission electron microscope or an optical microscope, if a certain phase is distributed in the state surrounding another phase, for example, the sea phase (A) surrounds islands (D) as shown in the photo of FIG. 4, the surrounding phase is called a "sea component". When the microscopic observation is similarly made, if a certain phase (C) is continuous even though voids (B) are present, as shown in the photo of FIG. 5, this phase is called a "continuous phase".

A transmission microscope is mainly used for the observation of the section, but where the sea component covers a broad region, an optical microscope can be used.

By the term "homogeneous mixture" is meant a constituent which can be regarded as one phase even if small specks are seen.

In order that the fiber or film retains its shape and an appropriate mechanical strength is manifested, it is important that the sea component or the continuous phase be present in an amount of at least 10%. When a high strength is especially required for the fiber or film, for example, where the molded body is used in the field of castings, preferably the sea component or continuous phase is present in an amount of 80 to 90% or larger.

In the case of an ordinary edible body comprising a cellulose and an edible polysaccharide, both the components are present in the form of a homogeneous continuous phase. In the case of an edible body comprising a cellulose and a polypeptide, the cellulose is present in the form of a sea component surrounding the islands of the polypeptide.

For example, when an edible body of the present invention comprising a cellulose and a separated soybean protein is observed by a transmission electron microscope, the size in the section of the island component differs according to the preparation process, but is ordinarily in the range of from 0.05 || m to 100 μm. In view of the feeling at the time of eating, preferably the size of the island component is within the above-mentioned range. The shape of the island component is ordinarily circular or ellipsoidal.

The observation using a transmission electron microscope is carried out in the following manner. A sample yarn in the wet state is dehydrated with methanol and substituted with a methacrylate resin, the yarn is embedded in the methacrylate resin, and an ultra-thin section having a thickness of 0.1 μm is prepared by using an ultramicrotome supplied by LKB Co. The sliced resin is dissolved in chloroform and soluble ingredients are removed. The section is observed at an acceleration voltage of 80 kV at 2000 to 6000 magnifications by using a transmission electron microscope (Model JEM12-00EX supplied by Nippon Denshi). In the case of observation using an optical microscope, a slice having a thickness of about 0.3 || m is similarly prepared. The resin is dissolved out by using chloroform, and a sample yarn containing polypeptide is dyed with Alizarine Blue to stain the polypeptide, or a sample yarn containing polysaccharide is dyed with an iodine solution to stain the polysaccharide. The observation is carried out at 100 to 400 magnifications. By the term "section" referred to herein is meant a section perpendicular to the extrusion direction in the case of an extrusion-molded body such as a yarn or film, and meant an optional section in the case of a powder or sphere.

In the edible molded body of the present invention, the strength can be maintained if the cellulose content is at least 5% by weight based on the dry product, though this value differs to some extent according to the kinds of edible polysaccharide and polypeptide. Nevertheless, this cellulose content should be determined while taking the intended use of the final molded body and the preparation characteristics into consideration. In connection with utilization in the field of food, for example, in case of an edible film or fabricated food products, preferably the polypeptide and/or polysaccharide (the edible polysaccharide and/or polypeptide will be called "guest component" hereinafter) is contained in an amount of at least 10% by weight, more preferably at least 40% by weight in the edible body of the present invention. In order that the edible body of the present invention does not give an incompatible taste on eating and does not remain in the mouth, the cellulose/guest component weight ratio is preferably in the range of from 5/95 to 90/10 and more preferably in the range of from 10/90 to 60/40. Where a polypeptide, edible polysaccharide and/or living body constituent is mixed with a powder or fine fiber of the cellulose in the solid state, if the cellulose content exceeds 10%, the mixture cannot be eaten at all because it remains in the mouth and has bitter taste. In view of this, it will be readily understood that the edible body of the present invention is excellent. In view of the reinforcing effect by the cellulose, preferably the mixing ratio of the guest component in the mixture is up to 95% by weight. When the cellulose content is extremely low, even if a cellulose having a high polymerization degree is used, the mechanical strength is little improved in a molded product of the edible body of the present invention. Preferably, the cellulose content is at least 5% by weight.

The molded product of the edible body of the present invention can be prepared according to the following procedures. At first, a mixed dope of the cellulose and the guest component is prepared. For this Purpose, there may be adopted (1) a method in which the cellulose specified in the present invention is completely or partially dissolved in an aqueous solution of an alkali having a specific concentration, the guest component is supplied in the powdery or solid state to the solution, and the guest component is dissolved or dispersed in the solution, and (2) a method in which both the cellulose and the guest component are indepedently dissolved in appropriate alkaline aqueous solutions and the solutions are mixed.

In the former method (1), the alkali is used in the form of an aqueous solution having a normality (hereinafter after referred to as "N") of 2.0 to 2.5 for dissolution of the cellulose. The cellulose is dissolved in this aqueous solution at a temperature of from $-10°$ C. to $10°$ C.

Otherwise, the dissolution of the cellulose is not completed, or even if completed, the solution is soon gelled, and the solution is not suitable for the subsequent mixing or spinning operation. The once-formed cellulose solution may be diluted with water according to the cellulose concentration, and this solution can be used for the dissolution or dispersion of the guest component. In the latter method (2), the cellulose is dissolved in the alkali solution according to the above procedures.

The guest component such as the polypeptide, edible polysaccharide and/or living body constituent is preferably dissolved in an aqueous solution of an alkali metal hydroxide. The temperature may be elevated to about 50° C. for the dissolution. The alkali concentration is 0.5 to 3.0 N. Although the upper limit of the alkali concentration in the alkaline solution is not particularly critical, since in the case of the polypeptide the main chain is readily decomposed if an aqueous solution having too high an alkali concentration is used, the upper limit is preferably set at the alkali concentration in the alkaline aqueous solution used for the dissolution of the cellulose. Note, it was found that, if a dissolved cellulose is present in a polypeptide solution, the decomposition of the polypeptide by an alkali is extremely delayed. This is an important functional effect of the present invention. If the alkali concentration is lower than 0.5 N, the guest component cannot be sufficiently dissolved. In the latter method (2), the alkali concentration in the solution of the cellulose need not be the same as the alkali concentration in the solution of the guest component, and these concentrations may be appropriately set while taking the mixing state and the advance of gelation into consideration.

As specific examples of the alkaline solvent used for formation of the dope, there can be mentioned aqueous solutions of hydroxides of alkali metals such as sodium. When the finally obtained molded body is used in the field of medicines or food, such an alkali metal hydroxide is preferred from the viewpoint of the safety, and this is one of advantages attained by the present invention.

When a molded edible body is prepared from this dope according to the method described hereinafter, the dissolved cellulose is generally regenerated to a cellulose having a crystal form of cellulose II, and a mechanical strength is manifested in the molded edible body. In view of the mechanical strength of the molded edible body, preferably the cellulose is completely dissolved in the preparation of the dope. In this case, a natural cellulose having an intramolecular hydrogen bond degree $Hb (3+6)$ of 0 to 48% or a regenerated cellulose having an intramolecular hydrogen bond degree $Hb (3)$ of 0 to 15%, the alkali solubility of which is substantially 100%, is used. However, in some cases, preferably an insoluble cellulose in the form of a fine fiber is present in the mixture. In this case, it is possible to use a dope in which a cellulose other than the alkali-dissolved cellulose specified in the present invention is present in an amount of up to 50 parts by weight per 100 parts by weight of the alkali-dissolved cellulose in the alkaline dope of the cellulose and guest component. If the amount of the undissolved cellulose exceeds 50 parts by weight, a sufficient mechanical strength cannot be guaranteed for the final molded body. Accordingly, specifically speaking, a natural cellulose having a value $Hb (3+6)$ of 49 to 60% or a regenerated cellulose having a value $Hb (3)$ of 15 to 30%, the alkali solubility of which is 67 to 90%, is used as the cellulose. In the case of this cellulose, the mixing amount should be adjusted so that the amount of the insoluble cellulose does not exceed the above-mentioned upper limit. This doe also can be prepared according to a method in which an alkali solution of a natural cellulose having a value $Hb (3+6)$ of 0 to 48% or a regenerated cellulose having a value $Hb (3)$ of 0 to 15% or an alkali dope formed by incorporating and dissolving the guest component in this alkali solution is mixed with a cellulose dispersion formed by swelling and dispersing a cellulose in an aqueous solution of an alkali having a normality smaller than 2. Almost all celluloses are merely swollen or dispersed in an aqueous solution of an alkali having a normality smaller than 2, preferably smaller than 1.5.

The above-mentioned alkali dope comprising the cellulose and guest component may further comprise a third component such as a diol, a polyol, an oil or fat, a seasoning, a pigment or a perfume, according to need.

A molded product of the edible body of the present invention can be prepared by extruding the above-mentioned dope directly into an acidic bath or a salt-containing acidic bath by using an ordinary extruder and molding the extrudate while performing coagulation and neutralization, followed by water washing and drying, if necessary (hereinafter referred to as "process A").

According to another process, the above-mentioned dope is extruded in water or an aqueous solution of a neutral salt, and the extrudate is coagulated and passed through an acidic aqueous solution to effect neutralization, followed by water washing and drying, if necessary (hereinafter referred to as "process B").

In each of the foregoing processes A and B, if the extrudate is drawn at a draw ratio of 1.1 to 1.6 at any of the coagulation, neutralization and drying steps, there can be obtained a molded body, such as a fiber or film, having an excellent mechanical strength.

When a powder or granule is prepared, the intended product can be obtained merely by stirring the extruded dope at the coagulation or neutralization step.

The edible body comprising the cellulose and guest component often contains 10 to 1200 parts by weight of water per 100 parts by weight of the dry edible body. If water is contained in an amount of several hundred parts, when the edible body is used as a food additive or for the production of an artificial meet, mixing of the edible body with other ingredients can be facilitated, and since this edible body is prepared by the wet process, an energy-consuming step such as drying, for the removal of water, can be omitted.

As the acid used at the coagulation and neutralization steps of the preparation process of the present invention, there can be mentioned nitric acid, sulfuric acid, hydrochloric acid, acetic acid and phosphoric acid, and the acid is used in the state dissolved in water or an organic solvent. The acid concentration is not particularly critical but is appropriately selected from the economical viewpoint.

As the salt used at the present step, there is preferably used an alkali metal or alkaline earth metal salt of nitric acid, sulfuric acid, hydrochloric acid, acetic acid or phosphoric acid. This salt may be used in combination with the above-mentioned acid. The concentration of the salt in the coagulating bath is from 0% to the saturation concentration. As the organic solvent, preferably an alcohol, a ketone, an amide or a sulfoxide is used, and from the economical viewpoint, an alcohol is especially preferred. When an alcohol is used, flowing of the guest component into the coagulating bath can be prevented, and the intramolecular hydrogen bond degree of the cellulose portion of the obtained edible body can be drastically reduced and the edibility and processability in the wet state of the edible body are preferably improved. The temperature of the coagulating bath is in the range of the freezing point of the used bath to 80° C. If the bath temperature is higher than 80° C., thermal decomposition of the edible body occurs. In most cases, the lower the bath temperature, the higher the mechanical strength of the edible body, although the temperature of the coagulating bath is not particularly critical. The obtained molded edible body can be finely cut and fed to the step for forming a final product. Generally, the molded edible body contains 10 to 1200 parts by weight of water per 100 parts by weight of the dry edible body.

The edible body prepared according to the process A is characterized in that, for example, in the case of the cellulose/starch edible body, if the edible body is formed into a fiber or film, it shows an elongation of at least 16% and about 40% at highest in the wet state. This is because the intramolecular hydrogen bond degree in the molecules constituting the edible body is extremely low. This is obvious from the 13C-NMR spectrum of the edible body obtained according to the process A. More specifically, of two envelopes appearing in the C4 carbon peak region (90.0 to 78.8 ppm) of the D-glucose units constituting the cellulose and starch molecules, the proportion of the envelope on the lower magnetic field side (the sharp peak component on the side of the magnetic field lower than about 85.5 ppm) is low and 8 to 50%, irrespective of the water content, and this indicates that the intramolecular hydrogen bond degree is inherently low. This suggests that the edible body sufficiently retains water in the wet state, and where the edible body is in the form of a fiber or a film, the processability in the wet state is excellent.

As pointed out above with respect to the process A, a film of the edible body can be prepared. For example, in the case of a 1/1 cellulose starch mixture, when the obtained film is naturally dried, the non-accessible content (the proportion of the non-deuterated hydroxyl group portion) defined by the deuteration IR method described hereinafter is 32 to 34%, and in the IR absorption region of the hydroxyl group at the equilibrium deuteration, which is attained in the experimental method defined in the instant specification, the ratio Hb of the optical density of the peak at 3430 cm$^{-1}$, attributed to the intramolecular hydrogen bond, to the optical density of the peak at 3360 cm$^{-1}$ is lower than 1.2. In short, the growth of the intramolecular hydrogen bond is small.

Figure 2:
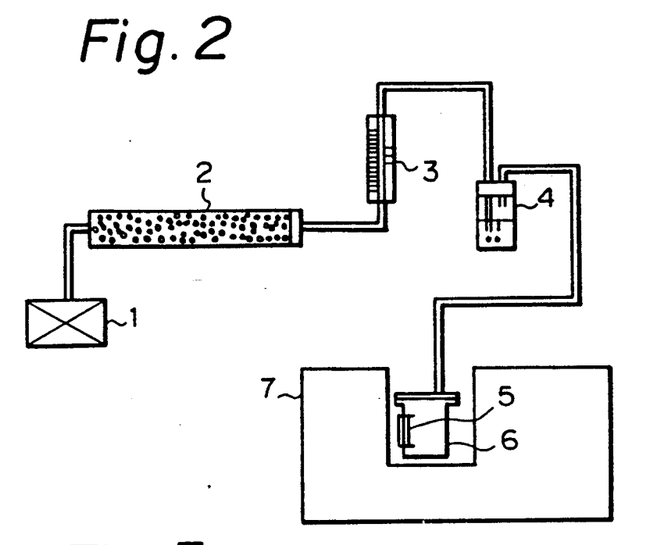
FIG. 2 is a diagram illustrating an apparatus for the deuteration IR method.

The experimental deuteration IR method used for determining a parameter indicating the structure of the edible body of the present invention comprising the cellulose and guest component and the method for determining the non-accessible content will now be described. The apparatus used is outlined in FIG. 2. A film of the edible body having a thickness of 10 to 30 μm is set at a deuteration cell 6. The cell 6 is set at 70° C. for removing water and preventing the absorption of heavy water. The film is allowed to stand for 10 minutes to remove excess water, and the IR spectrum of the blank (the film of the edible body before the deuteration) is measured. A dry nitrogen gas at 25° C., which is obtained from a bomb 1 through a drying silica gel 2, is fed at a flow rate of 1000 ml/min. Note, reference numeral 3 represents a flow meter. Heavy water (20 cc) set at 25° C. is charged in a heavy water bubbling vessel 4 and is bubbled by the nitrogen gas, the bubbled heavy water is introduced into the deuteration cell 6, and the sample on a sample stand 5 is deuterated. The deuteration is carried out for 120 minutes under this condition, and the IR spectrum is determined by an IR spectrum device 7.

Figure 3:
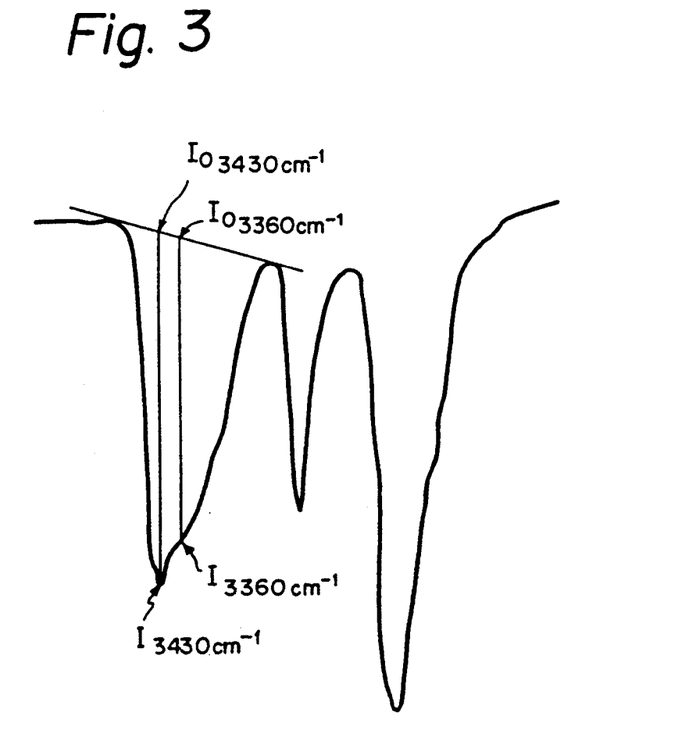
FIG. 3 shows an infrared absorption spectrum after the deuteration (equilibration), which is used for the calculation of the ratio (Hb) of the optical density at 3430 cm$^{-1}$ to the optical density at 3360 cm$^{-1}$ at the time of the equilibrium deuteration.

At first, as shown in FIG. 3, a base line touching the peaks at 3600 cm$^{-1}$ and 3000 cm$^{-1}$ is drawn, and each of the transmittances at the crossing points of the vertical lines corresponding to 3430 cm$^{-1}$ and 3360 cm$^{-1}$ and the base line is adopted as the intensity $I_0$ at the corresponding wave number. Furthermore, the intensity I of each of the transmitted lights at 3430 cm$^{-1}$ and 3360 cm$^{-1}$ is expressed by the transmittance at the crossing point of the vertical line at the corresponding wave number and the spectrum. Then, Hb is determined from $I_0$ and I according to the following formula:

$$Hb = \log \frac{I_{03430} - 1}{I_{3430} - 1} / \log \frac{I_{03360} - 1}{I_{3360} - 1}$$

The non-accessible content is calculated according to the process proposed by J. Mann and H.J. Marrinan in Trans. Faraday Soc., 52, 492 (1956).

The edible body prepared according to the process B is characterized in that, for example, in the case of a cellulose starch mixture, in the 13C-NMR spectrum of the edible body, of two envelopes appearing in the C4 carbon peak region (90.0 to 78.8 ppm) of the D-glucose units constituting the cellulose and guest component, the proportion of the envelope on the lower magnetic field side (the sharp peak component on the side of the magnetic field lower than about 85.5 ppm) is 45 to 65%, irrespective of the water content, and the intramolecular hydrogen bond degree is inherently high. Accordingly, where the edible body is in the form of a fiber or a film, enhanced mechanical characteristics are manifested in either the dry state or the wet state. In the film of the edible body of the present invention, for example, in the case of a 1/1 cellulose II/starch mixture, when the film is naturally dried, the non-accessible content (the proportion of the non-deuterated hydroxyl group portion) defined by the deuteration IR process is 44 to 47% and in the IR absorption region attributed to the hydroxyl group at the equilibrium deuteration, the ratio Hb of the optical density of the peak at 3430 cm$^{-1}$, attributed to the intramolecular hydrogen bond, to the optical density of the peak at 3360 cm is at least 1.2. In short, the intramolecular hydrogen bond is developed. The fact that the non-accessible portion shows the intramolecular hydrogen bond is a criterion indicating a high structural regularity and guarantees the manifestation of high mechanical characteristics.

In order to further improve the mechanical characteristics, the orientation degree of the fiber or film of the edible body prepared by the process A or B may be further increased. For this purpose, the fiber or film can be drawn in the coagulating bath or may be drawn by a hot roller or the like before and after water washing. The drawing temperature is 40 to 200° C. If the drawing temperature is lower than 40° C., the effect of the drawing is not substantially attained, and if the drawing temperature is higher than 200° C., there is a risk of deformation of the final product. A sufficient improvement of the strength is attained if the draw ratio is about 1.2.

Since the constituent polymer is oriented, a strength comparable to that of a collagen film can be obtained, and the edible body can be used for a casing of a sausage.

The molded edible body of the present invention can take various shapes such as the shape of a fiber, a film, a sphere, a powder, and a granule, and a variety of structures can be formed from the molded edible body. Therefore, the edible body of the present invention can be used in various fields. For example, in connection with food products, the edible body of the present invention in the form of a fiber can be used as an additive or reinforcer to processed fish meat products such as boiled fish paste, fish meat sausage, and canned crab, and as an additive or reinforcer to processed meat products such as sausage, corned beef, and ham. Furthermore, the fiber of the edible body of the present invention can be bundled by any method and can be seasoned and used as an artificial meat or a component to be mixed with a natural meat. The edible body molded into a film or sheet can be used as a casing material, an edible cooking film or a food wrapping film, and a spherical or granular product of the edible body of the present invention can be used as a fish egg substitute such as artificial salmon roe. Moreover, a powdery or granular product of the edible body of the present invention can be used as a food additive for attaining emulsification or as a excipient and can be applied to the production of ice cream, boiled fish paste, dumpling stuffed with minced pork, and shao-mai skin. As pointed out hereinbefore, the edible body of the present invention can be eaten without an incompatible taste even if the celluloss content is high, and therefore, an antidiarrheic effect possessed by the cellulose can be sufficiently exerted and the edible body of the present invention can be applied to the production of medicinal tablets as well as the above-mentioned food products.

The present invention will now be described in detail with reference to the following examples that by no means limit the scope of the invention.

EXAMPLE 1

A regenerated cellulose nonwoven fabric (Benleese ® supplied by Asahi Kasei Kogyo K.K.) was sufficiently washed dried and then dissolved at a concentration of 2.5% by weight in a 2.5 N aqueous solution of sodium hydroxide, a separated soybean protein (Fuji-Pro R ® supplied by Fuji Seiyu) was dissolved in the thus-prepared solution so that the cellulose/separated soybean protein dry weight ratio was 5/5, 7/3 or 8/2. The solution was stirred and mixed by a high-speed stirrer (supplied by Nippon Seiki). Thus, three homogeneous dopes were prepared. Each dope was filtered through a 250-mesh screen and extruded at a rate of 45 cc/min from a nozzle having 150 holes, each having a diameter of 0.25 mm, in a coagulating bath containing 5% by weight of HCl and 4% by weight of $CaCl_2$. The extrudate was wound at a winding speed of 7 m/min and washed with water to obtain an edible protein fiber.

Figure 6:
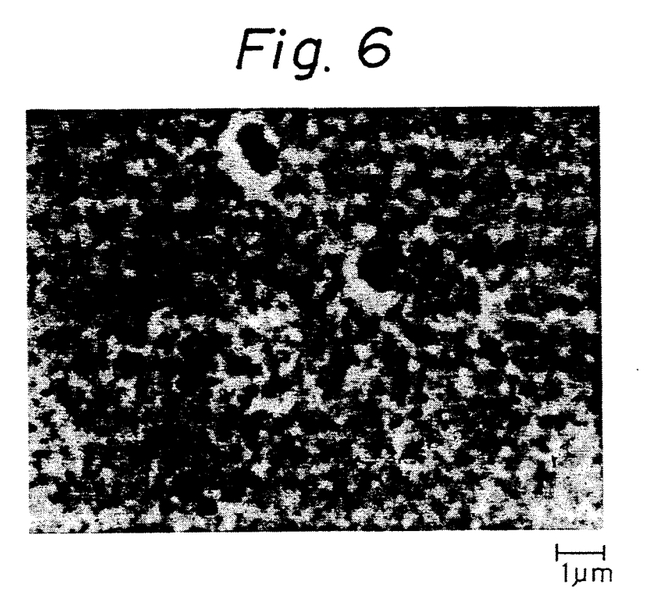
Figure 7:
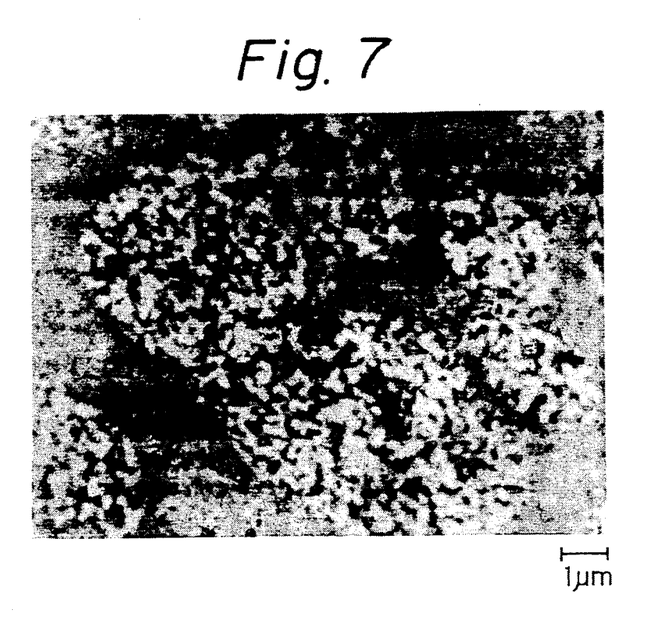
Figure 8:
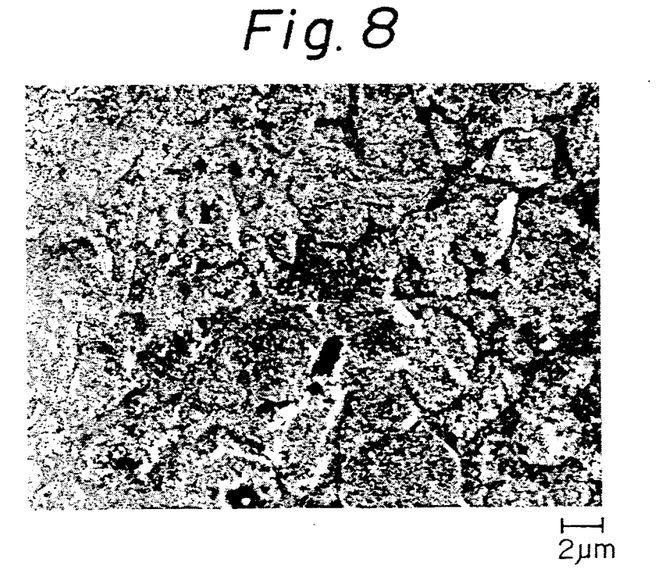

An ultra-thin slice was prepared according to the method described hereinbefore, and the slice was observed by a transmission electron microscope (Model JEM 1200EX supplied by Nippon Denshi) at an acceleration voltage of 80 kV at 2000 to 6000 magnifications. It was found that the fiber had an islands-in-sea structure in which the sea component was the cellulose. The maximum size of the island component was 200 μm and the minimum size of the island component was 0.2 μm (see FIGS. 6 through 8). In order to confirm that the island component was composed of the protein, the slice of the fiber having a separated soybean protein/cellulose weight ratio of 7/3 was dyed with Alizarine Blue, a protein-staining dye, and was observed by an optical microscope. It was found that only the island component was dyed blue.

COMPARATIVE EXAMPLE 1

The same separated soybean protein (Fuji-Pro R) as used in Example 1 was dissolved at a concentration of 15% by weight in an aqueous solution of sodium hydroxide having a concentration of 1.8% by weight, and a microcrystalline cellulose (Avicel ® supplied by Asahi Kasei Kogyo K.K.) was added to the solution and the solution was stirred and mixed by a high-speed stirrer to prepare a dope in which the Acicel ® /soybean protein weight ratio was 3/7. The formed dope was cast on a glass sheet and coagulated in the same coagulating bath as used in Example 1, followed by water washing, to obtain a film.

Figure 9:
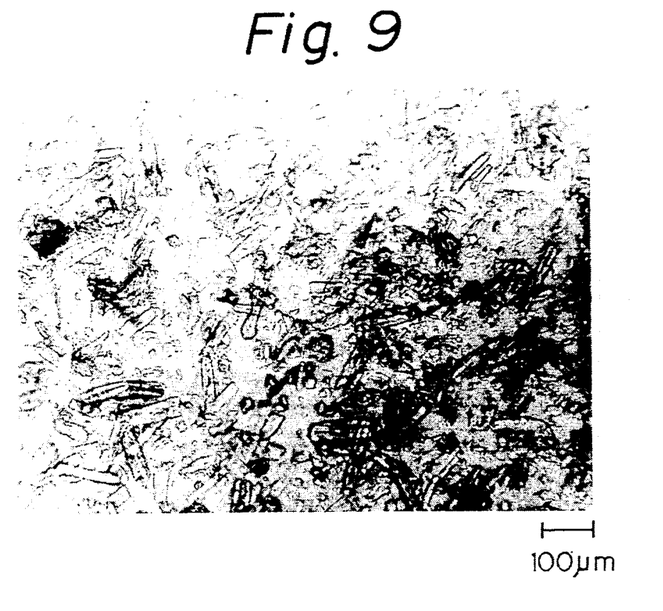

When the film was dyed with Alizarine Blue and observed by an optical microscope, it was found that Avicel was dispersed as the island component in the protein component (see FIG. 9).

EXAMPLE 2

The water content of Alaska pulp was adjusted to about 100% by weight and the pulp was subjected to a blasting treatment under 30 kg/cm² for 20 seconds to obtain a cellulose having a polymerization degree of 400. The cellulose was dissolved at a concentration of 6.0% by weight in a 2.5 N aqueous solution of sodium hydroxide.

Separately, corn starch was dissolved at a concentration of 5.0% by weight in a 0.5 N aqueous solution of sodium hydroxide.

These solutions were mixed at a weight ratio of 5/6 to obtain a dope comprising the cellulose and corn starch at a weight ratio of 1/1. The dope was deaerated at 5000 rpm for 20 minutes by a centrifugal separator. Then, the dope was cast on a glass sheet, coagulated in a coagulating bath containing 14 g/dl of $H_2SO_4$ and 26 g/dl of $Na_2SO_2$, and washed with water to form a film.

In the same manner as described in Example 1, the film was embedded in the resin and a slice was prepared. The slice was observed by a transmission electron microscope in the same manner as described in Example 1. The entire phase was continuous and the corn starch could not be distinguished from the cellulose portion (see FIG. 5).

When the slice was dyed with an iodine solution and observed by an optical microscope, the slice was entirely dyed a bluish violet color, and sea island components could be discriminated.

EXAMPLE 3

A regenerated cellulose nonwoven fabric (Benleese ® supplied by Asahi Kasei Kogyo K.K was sufficiently washed with water, dried and then dissolved at a concentration of 2.2% by weight in a 2.5 N aqueous solution of sodium hydroxide. Powdery corn starch (supplied by Nippon Shokuhin Kogyo) was added to the thus-prepared solution so that the cellulose/corn starch weight ratio was 2/8. The solution was stirred and mixed by a high-speed stirrer (supplied by Nippon Seiki) to obtain a homogeneous dope. The dope was filtered through a 250-mesh screen and extruded at a rate of 45 cc/min through a nozzle having 150 holes, each having a diameter of 0.25 mm, into a coagulating bath containing 14 g/dl of $H_2SO_4$ and 26 g/dl of $Na_2SO_4$. The extrudate was wound at a winding speed of 7 m/min to obtain an edible protein fiber.

In the same manner as described in Example 1, the obtained fiber was observed by a transmission electron microscope. The entire fiber and a continuous network structure.

A slice of the fiber was dyed with a 1 N iodine solution and was observed by an optical microscope. It was found that circular or ellipsoidal islands dyed a bluish violet color and having a size of about 20 μm were dispersed in the sea component dyed a light bluish violet color.

EXAMPLE 4

The water content of Alaska pulp was adjusted to 100% by weight, and the pulp was subjected to a blasting treatment under 30 kg/cm² for 20 seconds to obtain a cellulose having a polymerization degree of 400.

A solution of this cellulose having a concentration of 4.5% by weight was prepared by using 2.5 N sodium hydroxide as the solvent.

Separately, a polypeptide shown in Table 1 was dissolved at a concentration of 20% by weight in a 1.0 N solution of sodium hydroxide.

Both the solutions were mixed so that the cellulose/polypeptide weight ratio was 1/1, and the mixed solution was deaerated cast on a glass sheet, and immersed for 2 minutes in a coagulating bath containing 14 g/dl of $CaCl_2$ and having a pH value adjusted to 2 to effect coagulation. Then, the film was washed with water and naturally dried. In each case, a homogeneous film was obtained, and the tensile strength of each film was measured. The obtained results are shown in Table 1.

TABLE 1

| Polypeptide | Tensile strength (kg/cm²) | Remarks |
|---|---|---|
| Sodium casein | 650 | Undissolved portion was not observed |
| Separated soybean protein | 480 | Undissolved portion was not observed |
| Egg albumin | 460 | Undissolved portion was not observed |

COMPARATIVE EXAMPLE 2

Alaska pulp having a polymerization degree of 1200 was dispersed at a concentration of 4.5% by weight in a 2.5 N solution of sodium hydroxide (the pulp was not dissolved but an opaque dispersion was formed).

The polypeptide used in Example 4 was dissolved at a concentration of 20% by weight in a 1.0 N aqueous solution of sodium hydroxide.

Both the solutions were mixed so that the cellulose/polypeptide weight ratio was 1/1, and an attempt was made to form a film in the same manner as described in Example 4. In each case, coagulation occurred, but the film was very brittle and measurement of the strength was impossible.

EXAMPLE 5

The water content of Alaska pulp was adjusted to 100% by weight and the pulp was subjected to a blasting treatment under 30 kg/cm² for 30 seconds to obtain a cellulose having a polymerization degree of 350. The cellulose was dissolved at a concentration of 5% by weight in a 2.5 N aqueous solution of sodium hydroxide, and water was added to the solution to form a solution having a cellulose concentration of 3% by weight.

A separated soybean protein (Fuji-Pro R supplied by Fuji Seiyu) was uniformly dissolved and dispersed in the cellulose solution so that the cellulose/separated soybean protein weight ratio was 2/8.

The formed dope was deaerated, extruded in a coagulating bath containing 14 g/dl of sulfuric acid and 26 g/dl of sodium sulfate through a nozzle having 150 nozzles, each having a diameter of 0.25 mm, wound at a winding speed of 10 m/min, and sufficiently washed with water to obtain a fibrous molded body.

The obtained fiber had a preferred elasticity and an excellent molded edible body. When eaten, the molded body tasted very good.

COMPARATIVE EXAMPLE 3

A cellulose obtained by grinding Alaska pulp having a polymerization degree of 1200 was incorporated and dispersed at a concentration of 3% by weight in a 1.5 N solution of sodium hydroxide.

In the same manner as described in Example 5, a separated soybean protein was added to the cellulose solution, and the mixed solution was spun.

The obtained molded body was very brittle, and when eaten, the cellulose remained in the mouth and it did not taste good.

EXAMPLE 6

The water content of Alaska pulp was adjusted to 100% by weight, and the pulp was subjected to a blasting treatment under 30 kg/cm² for 20 seconds to obtain a cellulose having a polymerization degree of 400. The cellulose was dissolved at a concentration of 4.5% by weight in a 2.5 N aqueous solution of sodium hydroxide.

Separately, a polysaccharide shown in Table 2 was dissolved at a concentration of 10% by weight in a 1.5 N aqueous solution of sodium hydroxide.

Both the solutions were mixed together so that the cellulose/polysaccharide solution weight ratio was 1/1. The mixed solution was deaerated, cast on a glass sheet, immersed for 2 minutes in an aqueous solution containing 14 g/dl of $CaCl_2$ and having the pH value adjusted to 2, immersed in water, and naturally dried at room temperature to obtain a homogeneous film.

The tensile strength of the film was measured. The obtained results are shown in Table 2.

Note, the wet tensile strength was measured by attaching a sample to a tensile tester, covering the sample with paper impregnated with water, allowing the sample to stand in this state for 5 minutes, and then carrying out the tensile test.

TABLE 2

| Polysaccharide | Tensile strength (kg/cm²) | | Remarks |
|---|---|---|---|
| | Dry state | Wet state | |
| Amylose from potato | 770 | 85 | Undissolved portion not observed |
| Sodium alginate | 680 | 72 | Undissolved portion not observed |
| Carrageenan | 710 | 81 | Undissolved not observed |

COMPARATIVE EXAMPLE 4

Alaska pulp (having a polymerization degree of 1200) was dispersed at a concentration of 4.5% by weight in a 2.5 N solution of sodium hydroxide (the pulp was not dissolved but was dispersed to form an opaque dispersion).

In the same manner as described in Example 6, the polysaccharide shown in Table 2 was mixed with the cellulose so that the cellulose/polysaccharide weight ratio was 1/1. Formation of a film was attempted in the same manner as described in Example 6. However, although the dope was coagulated, the obtained film was brittle and measurement of the strength was impossible.

EXAMPLE 7

A mixed dope was prepared by using amylose in the same manner as described in Example 6 except that the amylose/cellulose weight ratio was 7/3.

The dope was deaerated and extruded into a coagulating bath containing 14 g/dl of sulfuric acid and 26 g/dl of sodium sulfate from a nozzle having 150 holes, each having a diameter of 0.25 mm. The extrudate was wound at a winding speed of 10 m/min and sufficiently washed with water to obtain a fibrous molded body.

When eaten the molded body, tasted very good.

COMPARATIVE EXAMPLE 5

A cellulose obtained by grinding Alaska pulp (having a polymerization degree of 1200) was dispersed at a concentration of 4.5% by weight in 2.5 N sodium hydroxide.

By using this cellulose dispersion and the amylose solution used in Example 7, spinning was tried in the same manner as described is Example 7. The obtained molded product was very brittle.

COMPARATIVE EXAMPLE 6

Sodium alginate and pullulan were dissolved in water at a concentration of 10% by weight, and the solution was cast and dried to obtain a film.

When measurement of the wet strength of the film was tried in the same manner as described in Example 6, the measurement was impossible because the film broke on contact with water.

EXAMPLE 8

The water content of Alaska pulp was adjusted to 100% by weight and the pulp was subjected to a blasting treatment under 30 kg/cm$^2$ for 20 seconds to obtain a cellulose having a polymerization degree of 400. The cellulose was dissolved at a concentration of 4.5% by weight in a 2.5 N aqueous solution of sodium hydroxide.

Separately, a living body constituent shown in Table 3 was dissolved in a 1.5 N solution of sodium hydroxide so that the solid content was 20% by weight.

Both the solutions were mixed together so that the cellulose/living body constituent weight ratio was 1/1. The formed dope was deaerated, cast on a glass sheet, and coagulated by immersion in a coagulating solution containing 14 g/dl of CaCl$_2$ and having the pH value adjusted to 2 for 2 minutes. The formed film was washed with water and naturally dried at room temperature to obtain a homogeneous film.

The tensile strength of the obtained film was measured. The obtained results are shown in Table 3.

TABLE 3

| Living body constituent | Tensile strength (kg/cm$^2$) | Remarks |
| --- | --- | --- |
| Raw soybean | 450 | Some undissolved portion observed |
| Defatted soybean | 390 | Some undissolved portion observed |
| Beef | 480 | Undissolved portion not substantially observed |
| Ground fish meat | 520 | Undissolved portion not substantially observed |

COMPARATIVE EXAMPLE 7

Alaska pulp having a polymerization degree of 1200 was dispersed at a concentration of 4.5% by weight in a 2.5 N solution of sodium hydroxide (the pulp was not dissolved but an opaque dispersion was formed).

In the same manner as described in Example 8, the living body constituent was mixed with the pulp dispersion so that the cellulose/living body constituent weight ratio was 1.1. Formation of a film was attempted in the same manner as described in Example 8. However, coagulation did not occur and a film could not be obtained.

EXAMPLE 9

The water content of Alaska pulp was adjusted to 100% by weight and the pulp was subjected to a blasting treatment under 30 kg/cm$^2$ for 30 seconds to obtain a cellulose having a polymerization degree of 350.

The cellulose was dissolved at a concentration of 3.0% by weight in a 2.5 N aqueous solution of sodium hydroxide. Then, raw soybean powder (NI-Protein NIP-O supplied by Gessetsu Kogyo) was incorporated into the solution so that the cellulose/raw soybean powder weight ratio was 3/7, and the soybean powder was emulsified and dispersed at 5° C.

The obtained dope was deaerated and extruded into a coagulating bath containing 14 g/dl of sulfuric acid and 26 g/dl of sodium sulfate from a nozzle having 50 holes, each having a diameter of 0.25 mm. the extrudate was wound at a winding speed of 11 m/min and sufficiently washed with water to obtain a fibrous molded body.

The obtained fiber had an elasticity comparable to that of natural meat and was an excellent edible molded body.

COMPARATIVE EXAMPLE 8

NI-Protein NIP-D was emulsified and dispersed at a concentration of 10% by weight in 2.5 N sodium hydroxide.

In the same manner as described in Example 9, a mixed dope was prepared and deaerated and spinning was attempted. However, spinning was impossible because the coagulating property was poor.

EXAMPLE 10

Alaska pulp having a polymerization degree of 1200 was hydrolyzed at 60° C. for 120 minutes with 6 N sulfuric acid to obtain a cellulose having a polymerization degree of 410. The water content of the cellulose was adjusted to 80% by weight and the cellulose was treated at a rotation number of 120 rpm and a temperature of 150° C. three times by using a twin-screw extruder (supplied by Suehiro Tekkosho) having a screw diameter of 80 mm and an L/D ratio of 8 to obtain a cellulose having a polymerization degree of 370. A solution containing 5% by weight of this cellulose was prepared by using a 2.5 N solution of sodium hydroxide as the solvent.

Separately, minced beef was dispersed in 2.5 N sodium hydroxide.

Both the liquids were mixed together so that the cellulose/beef (solid component) weight ratio was 2.8, and the formed dope was deaerated and extruded into a coagulating bath containing 14 g/dl of sulfuric acid and 26 g/dl of sodium sulfate from a nozzle having 150 holes, each having a diameter of 0.25 mm. The extrudate was wound at a winding speed of 10 m/min and sufficiently washed with water to obtain a fibrous molded body. When eaten the molded body tasted very good.

COMPARATIVE EXAMPLE 9

A cellulose obtained by grinding Alaska pulp (having a polymerization degree of 1200) was dispersed at a concentration of 5% by weight in 2.5 N sodium hydroxide. In the same manner as described in Example 10, a fibrous molded body was prepared by using the thus-formed cellulose dispersion. The obtained molded body was brittle, and when eaten, the cellulose remained in the mouth and the molded body was not suitable as an edible body.

EXAMPLE 11

The same cellulose as used in Example 2 was dissolved at a concentration of 2% by weight in 2.5 N sodium hydroxide, and Alaska pulp was dispersed in this cellulose solution at a concentration of 4.5% by weight as the cellulose.

Potato starch was dissolved at a concentration of 10% by weight in a 2.5 N aqueous solution of sodium hydroxide.

Both the liquids were mixed together so that the total cellulose amount was equal to the amount of starch. the formed dope was deaerated and cast on a glass sheet. The glass sheet was immersed in an aqueous solution containing 14 g/dl of sulfuric acid and 24 g/dl of sodium sulfate for 2 minutes and then immersed in water, followed by natural drying, to obtain a homogeneous film.

The tensile strength of the film was 240 kg/cm$^2$. When eaten, the film could be chewed but had a slight cellulose taste.

We claim:

1. An edible body consisting essentially of a structural body comprising a cellulose having a crystal form of cellulose II, which is regenerated from an aqueous solution of an alkali metal hydroxide, and at least one guest component selected from the group consisting of a polypeptide and an edible polysaccharide;

said polypeptide being selected from the group consisting of soybean protein, casein, albumin, globulin and gelatin, their sodium, potassium and calcium salts, and their hydrolyzed products, and said edible polysaccharide being selected from the group consisting of gum arabic, arabinogalactan, alginic acid, gum ghatti, carrageenin, karaya gum, xanthane gum, guar gum, devil's-tongue powder, tamarind gum, tala gum, tragacanth gum, furcellaran, pullulane, pectin, chitin, locust bean gum, xylan, mannan and starches, and sodium, potassium and calcium salts thereof;

wherein the structural body is in the form of islands-in-the-sea and the cellulose II or a homogeneous mixture of the cellulose II and the polysaccharide is present as the sea component or a continuous phase in an amount of at least 10% based on the structural body.

2. An edible body according to claim 1, wherein the polymerization degree of the cellulose is 100 to 1200.

3. An edible body as set forth in claim 1, wherein the cellulose/guest component weight ratio is in the range of from 5/95 to 90/10.

4. An edible body according to claim 1, wherein the cellulose/guest component weight ratio is in the range of from 10/95 to 90/10.

5. A process for the preparation of an edible body, which comprises the steps of:

dissolving cellulose in an aqueous solution of an alkali metal hydroxide to prepare a cellulose solution in which the cellulose is completely dissolved or in which up to 50 parts by weight of swollen and undissolved cellulose is dispersed per 100 parts by weight of dissolved cellulose, incorporating with the cellulose solution at least one guest component selected form the group consisting of a polypeptide, an edible polysaccharide and an edible material which is derived from a plant, an animal or a microorganism and mainly composed of polypeptide or polysaccharide; said polypeptide being selected from the group consisting of soybean protein, casein, albumin, globulin and gelatin, their sodium, potassium and calcium salts, and their hydrolyzed products, and said edible polysaccharide being selected from the group consisting of gum arabic, arabino galactan, alginic acid, gum ghatti, carrageenan, karaya gum, xanthane gum, guar gu, devil's-tongue powder, tamarind gum, tala gum, tragacanth gum, phaseleran, pulleulane, pecytin, chitin, locust beam gum, furcellaran and starches, and sodium, potassium and calcium salts thereof, said gudiest component being incorporated directly or in the form of a solution in an aqueous solution of an alkali metal hydroxide, to form a dope in which at least 50% by weight of the total guest component is dissolved;

extruding the dope through an extruder;

coagulating the extrudate; and neutralizing, water-washing and optionally drying the extrudate.

6. A process according to claim 5, wherein coagulation and neutralization are carried out in an acidic bath or an acidic bath containing a salt.

7. A process according to claim 5, wherein coagulation is carried out in water or an aqueous solution of a neutral salt and neutralization is carried out in an acidic aqueous solution.

8. A process according to claim 5, wherein drawing is carried out at a draw ratio of 1.1 to 1.6 in at least one step of coagulation, neutralization, water washing and drying.

9. A process according to claim 5, wherein the weight ratio of the total cellulose to the total guest component in the dope is in the range of from 5/95 to 90/10.

10. A process according to any of claims 1, 5, 9 and 10, wherein the weight ratio of the total cellulose to the total guest component is in the range of from 10/90 to 60/40.

11. A process according to claim 5, wherein the cellulose is a natural cellulose in which the intramolecular hydrogen bond degree Hb (3+6) at the C3 and C6 positions, defined by the CP/MAS 13C-NMR measurement, is not more than 60% or a regenerated cellulose in which the intramolecular hydrogen bond degree Hb (3) at the C3 position is not more than 30%, and the alkali solubility of the cellulose is 67 to 100% by weight.

12. A process according to claim 5, wherein the cellulose is a natural cellulose in which the intramolecular hydrogen bond degree Hb (3+6) at the C3 and C6 positions, defined by the CP/MAS 13C-NMR measurement, is 0 to 48% or a regenerated cellulose in which the intramolecular hydrogen bond degree Hb (3) at the C3 position is 0 to 15%, and the cellulose is substantially free of an undissolved cellulose component.

13. A process according to claim 5, wherein the content of the dissolved cellulose component is 0.2 to 15% by weight based on the entire dope.

14. A process according to claim 5, wherein the polymerization degree of the cellulose is 100 to 1200.

15. A process according to claim 5 wherein the alkali metal hydroxide is sodium hydroxide.

16. A process according to claim 5, wherein the edible material derived from a plant is selected from the group consisting of oil cakes, grains, beans plant stalks and leaves, algae and tuberous roots.

17. A process according to claim 5, wherein the edible material derived from an animal is selected from the group consisting of fish meal, meat, entails, egg constituents and milk constituents.

18. A process according to claim 5, wherein the ediblematerial derived from a microorganism is selected from the group consisting of yeast, bacteria and molds.

19. A process according to claim 5, wherein the edible material contains at least 50% by weight, based on the total solid, of the polypeptide or polysaccharide.

* * * * *

UNITED STATES PATENT AND TRADEMARK OFFICE
CERTIFICATE OF CORRECTION

PATENT NO. : 4,994,285

DATED : February 19, 1991

INVENTOR(S) : HISANO et al.

It is certified that error appears in the above-identified patent and that said Letters Patent is hereby corrected as shown below:

Claim 1, col. 19, line 63, delete "carrageenin" and insert --carrageenan--.

Claim 4, col. 20, line 14, delete "10/95 to 90/10" and insert --10/90 to 60/40--.

Claim 5, col. 20, line 24, delete "form" and insert --from--;

line 37, after "guar" delete "gu" and insert --gum--;

line 38, delete "pulleulane" and insert --pullulane--;

line 39, delete "cytin" and insert --ctin--; also delete "beam" and insert --bean--;

line 41, delete "gudiest" and insert --guest--;

UNITED STATES PATENT AND TRADEMARK OFFICE
CERTIFICATE OF CORRECTION

PATENT NO. : 4,994,285

DATED : February 19, 1991

INVENTOR(S) : HISANO et al.

It is certified that error appears in the above-identified patent and that said Letters Patent is hereby corrected as shown below:

Claim 10, col. 20, line 65, delete "9 and 10" and insert --6 and 7--.

Claim 11, col. 21, line 6, delete "intramolecularhydrogen" and insert --intramolecular hydrogen--.

Claim 17, col. 22, line 11, delete "entails" and insert --entrails--.

Claim 18, col. 22, lines 13 and 14, delete "ediblematerial" and insert --edible material--.

Signed and Sealed this

Eighth Day of December, 1992

Attest:

DOUGLAS B. COMER

*Attesting Officer*     Acting Commissioner of Patents and Trademarks